April 27, 1965 F. W. BUSE 3,180,696
COLUMN INSERT BEARING HOUSING
Filed March 27, 1963 3 Sheets-Sheet 1

INVENTOR.
FREDERIC W. BUSE
BY
ATTORNEY

April 27, 1965 F. W. BUSE 3,180,696
COLUMN INSERT BEARING HOUSING
Filed March 27, 1963 3 Sheets-Sheet 2

INVENTOR.
FREDERIC W. BUSE
BY
ATTORNEY

United States Patent Office 3,180,696
Patented Apr. 27, 1965

3,180,696
COLUMN INSERT BEARING HOUSING
Frederic William Buse, Bloomsbury, N.J., assignor to Ingersoll-Rand Company, New York, N.Y., a corporation of New Jersey
Filed Mar. 27, 1963, Ser. No. 268,270
15 Claims. (Cl. 308—15)

The present invention relates to centrifugal pumps, blowers, hydraulic turbines and the like, and more particularly to a sleeve bearing housing for vertical shaft bearings in such apparatus.

Heretofore the shaft of vertical type pumps was supported and aligned by intermediate bearings which were clamped between two flanges on the pump column. At each shaft bearing location two bearing supporting flanges had to be welded on adjacent pieces of the pump column. The flanges on the columns had to be machined after welding to eliminate distortions of alignment caused by the heat of welding, and to thus achieve proper parallel alignment of the flange faces. The flanges, even after machining, still had some axial misalignment of the flange faces which resulted in excessive wear of the sleeve bearing and the shaft. This shaft wear necessitated frequent replacement of the expensive shaft.

In addition, a great number of parts, e.g. two flanges, a bearing housing, flange bolting and a lengthy operation, e.g. welding of the flanges on to the column, and machining of the flange and bearing housing faces were required in order to assemble the shaft and bearing.

U.S. Patent No. 1,812,471 issued to W. H. Cater on June 30, 1931, recites the type of structure hereinbefore discussed where two flanges are screwed to each end of two pieces of the column to provide a support for the bearing housing of the shaft bearing. This structure has the disadvantage of requiring a number of parts to install the bearing and, where the pump shaft is of any length, it requires that the column be provided in a number of pieces. It can readily be understood that with this type of structure the installation or replacement of the bearing becomes a lengthy and tedious operation because of the number of parts which must be disassembled and then later reassembled.

It is the general object of the present invention to avoid and overcome the foregoing and other difficulties of the objections to the prior art practices by the provision of a bearing housing which will allow the use of a one piece column.

Another object of the present invention is to reduce the number of parts required to install the bearing housing in the column.

Yet another object of the present invention is to reduce machining time, tolerances, eliminate welding or screwing of flanges on the column and otherwise reduce the expense in terms of labor time required to install a bearing housing in a column.

A further object of the present invention is to reduce misalignment of the bearing housing with respect to the shaft in both the axial and the horizontal planes, and thus eliminate to a large extent the possibility of excessive shaft wear.

The aforesaid objects of the present invention and other objects which will become apparent as the description proceeds are achieved by providing a column and bearing assembly comprising the combination of an integral column and guide bearing means disposed in the column. The guide bearing means is provided with a bearing housing extending through the column, a sleeve bearing disposed in the bearing housing to provide a wear surface and anchor means disposed on the bearing housing to anchor the bearing means to the column.

For a better understanding of the present invention reference should be had to the accompanying drawings wherein like numerals of reference indicate similar parts throughout the several views and wherein.

Although the principles of the present invention are broadly applicable to any installation where shafts are disposed inside columns and where the shafts are supported by intermediate bearing installations such as in the use of pumps, blowers, hydraulic turbines and the like, the present invention is particularly adapted for use in conjunction with vertical type pumps aligned by intermediate bearings disposed in the pump column and hence it has been so illustrated and will be so described.

Figure 1:
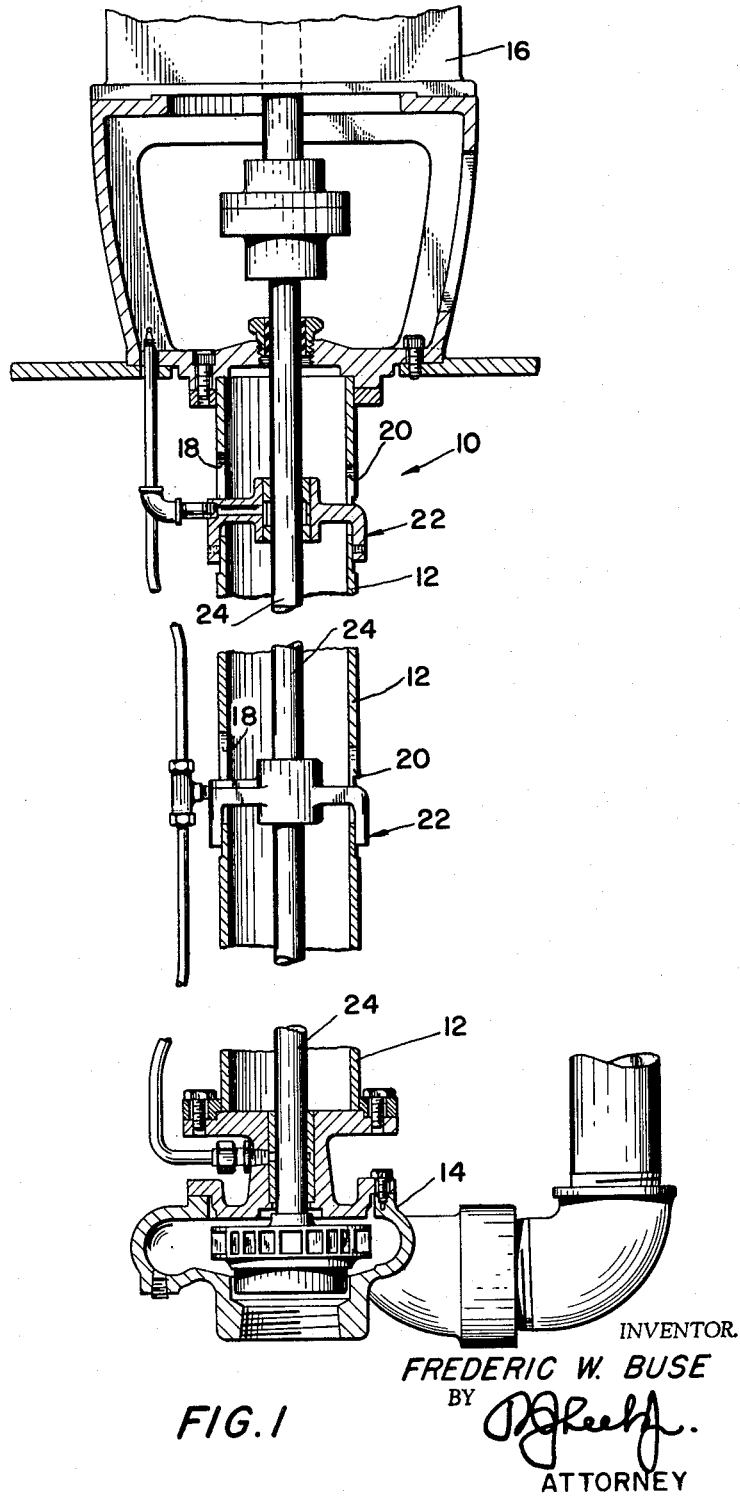
FIGURE 1 is a vertical sectional view of a vertical pump assembly showing the location of the bearing housing in relation to the column and broken away to reduce the length of such figure.

With specific reference to the form of the present invention illustrated in the drawings and referring particularly to FIGURE 1 a pump column and bearing assembly indicated generally by the reference numeral 10 and embodying a pump column 12 running vertically from a standard pump 14 to a standard motor 16, the pump 14 being at the vertical bottom (FIGURE 1) of the pump column 12, and the motor 16 being at the top of the pump column 12.

Figure 2:
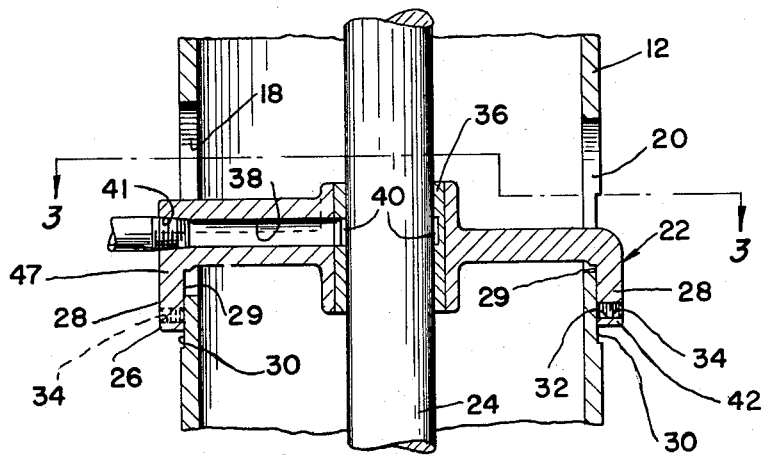
FIGURE 2 is a vertical sectional enlarged view of the bearing housing installed on the column.

The pump column 12 is provided with two holes 18 and 20 as shown in FIGURE 2, disposed axially horizontally opposite to one another to provide a means for installing a guide bearing means, such as a guide bearing assembly 22 (FIGURES 1 and 2) in place inside the column 12. The *guide* bearing assembly 22 (FIGURES 1 and 2) provides guidance and support for a shaft 24 (FIGURE 1) connected to the motor 16 and driving the pump 14. The shaft 24 is centrally disposed inside the pump column 12.

The bearing assembly 22 has a bearing housing 26 extending through holes 18 and 20 of the pump column 12, to provide support for the bearing assembly 22. The ends 28 of the bearing housing 26 are bent parallel to the pump column 12 as shown in FIGURE 2, so that the bearing assembly 22 can be properly positioned on the pump column 12. In order to provide a smooth and accurate fit between the inside surface 29 of the ends 28 and the pump column 12 (FIGURE 2), the outside diameter of a portion of the outer surface 30 of the pump column 12 is reduced by machining to a smooth finish. Thus the inside surface 29 of the ends 28 will fit accurately against the machined surface 30 of the pump column 12.

Figure 3:
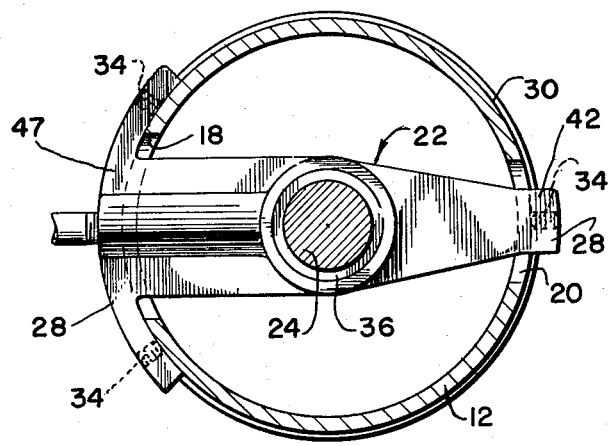
FIGURE 3 is a horizontal sectional view along the line 4—4 of FIGURE 2 in the direction of the arrows.

To securely anchor the bearing housing 26 to the pump column 12 anchor means, such as screws 34, disposed in screw holes 32 (FIGURE 2) are provided on the bent ends 28 of the bearing housing 26. It can be readily seen that by tightening the screws 34 and causing them to press tight against the machined surface 30 of the pump column 12, the bearing housing 26 will be securely anchored and properly centered in position on the pump column 12. In order to provide a wear surface to rest against the shaft 24, and which is softer than the surface of the bearing housing 26, a standard bearing, such as a sleeve bearing 36, is provided in the inner portion of the bearing housing 26 (FIGURES 2 and 3). To provide proper lubrication to the sleeve bearing 36, conduits 38 and 40 are provided in the bearing housing 26 and in the sleeve bearing 36 respectively. Conduit 38 communicates with conduit 40 to provide lubricating fluid, such as oil, to the sleeve bearing 36. The lubricating fluid can be supplied to conduits 38 and 40 through an opening 41 disposed on the bearing housing 26, by any number of known methods such as a forced feed lubricating system (not shown).

Figure 4:
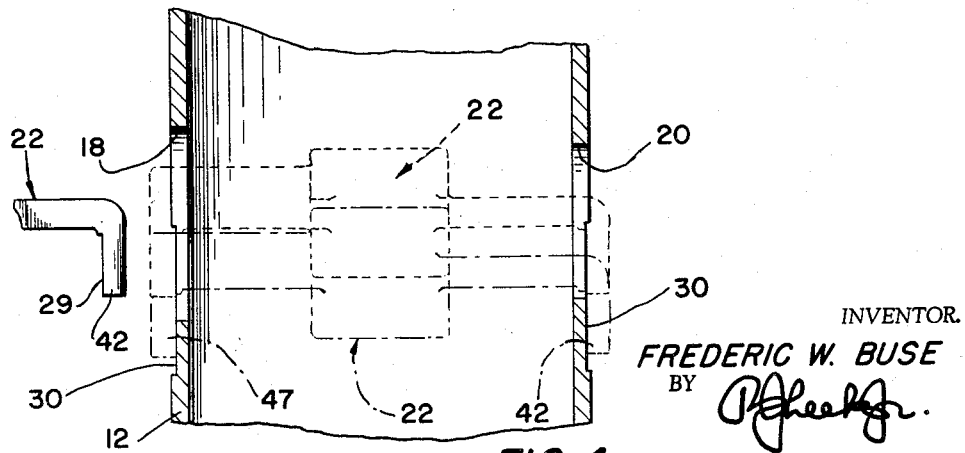
FIGURE 4 is an elevational sectional view showing in detail the installation of the bearing housing in position on the column.
Figure 5:
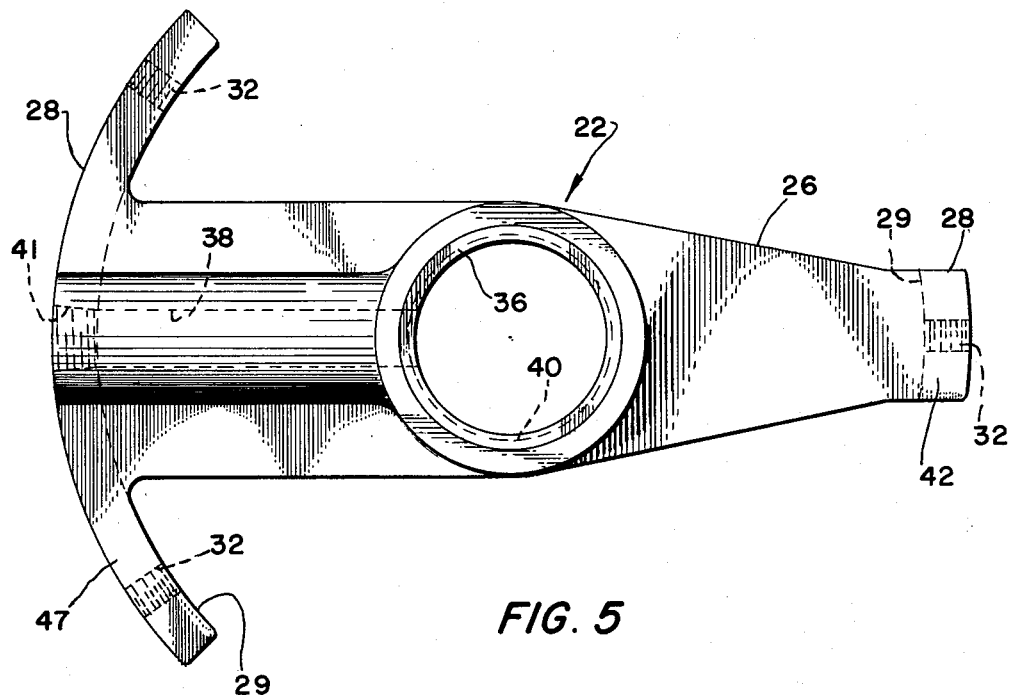
FIGURE 5 is a top detailed view of the bearing housing.

Holes 18 and 20 on the pump column 12 are utilized to install the guide bearing assembly 22 in position on the pump column 12 as shown in FIGURE 4. The guide bearing assembly is inserted in the pump column 12 through the holes 18 and 20 and it is dropped into place on the pump column 12 as shown in FIGURE 4. The inside surface 29 of front leg 42 and rear leg 47, fits snugly against the machined surface 30 on the pump column 12.

It may be readily seen from the above description that the bearing assembly 22 can be easily installed in place in the pump column 12. The bearing assembly 22 will be anchored in place quite simply by tightening the screws 34 against the machined portion of the pump column 12. It is further apparent that since the bearing assembly 22 is installed in the pump column 12 by use of holes 18 and 20, a one piece column pipe may be employed rather than the multiple piece column pipe heretofore employed. Since a small number of parts are utilized to install the bearing assembly 22 in the pump column 12, it will facilitate the replacing of worn sleeve bearings 36 at a reduced labor cost. Further since the holes 18 and 20 can be machined with a reasonable high degree of accuracy, and since the rear leg 47 (FIGURES 1, 2, 3 and 5) is cylindrical and will accurately fit the circumference of the machined portion 30 of the pump column 12, the bearing assembly 22 will always be axially aligned with the axis of the pump column 12 to insure that the shaft 24 is kept in axial alignment at all times.

In operation, once a number of guide bearing assemblies 22 are securely anchored to the pump column 12, then the shaft 24 is inserted through such series of bearing assemblies 22 which are installed in the pump column 12 at predetermined intervals.

It will be understood by those skilled in the art that alternatively any number of anchoring means can be employed to secure the bearing assembly to the column pipe 12 such as riveting, bolting, etc. Also this apparatus can be employed in any application where a column is used such as in blowers, hydraulic turbines, etc.

Still alternatively the surface of the column need not be machined. The bearing assembly can be installed directly on the outer surface of the column.

Still further alternatively, the sleeve bearing 36 can be eliminated by making the bearing housing of material, such as bronze, that could be used directly as the bearing surface.

It will be recognized by those skilled in the art that the objects of the present invention have been achieved by providing a novel column and bearing assembly which permits the employment of a one piece column and by providing a guide bearing assembly which will be easily and cheaply installed with a small number of parts, thereby reducing misalignment of the guide bearing assembly with respect to the axis of the column.

While in accordance with the patent statutes a preferred embodiment of the present invention has been illustrated and described in detail, it is to be particularly understood that the invention is not limited thereto or thereby.

I claim:

1. A column and bearing assembly comprising the combination of:
   (a) an integral pipe column, a shaft in said pipe column,
   (b) guide bearing means disposed in said pipe column to support said shaft, said guide bearing means comprising:
      (1) a one piece bearing housing extending through said pipe column,
      (2) a sleeve bearing disposed in said bearing housing to provide a wear surface for said shaft,
      (3) said bearing housing being provided with screw holes, and
      (4) screws disposed in said screw holes to anchor said guide bearing means to said column.

2. A column and bearing assembly comprising the combination of:
   (a) an integral pipe column, a shaft in said pipe column,
   (b) a guide bearing assembly disposed in said pipe column to support said shaft, said guide bearing assembly comprising:
      (1) a one piece bearing housing extending through said column,
      (2) a sleeve bearing disposed in said bearing housing to provide a wear surface for said shaft,
      (3) said bearing housing being provided with screw holes,
      (4) screws disposed in said screw holes to anchor said guide bearing means to said column, and
      (5) conduits disposed in said bearing housing and in said sleeve bearing to provide lubrication to said sleeve bearing.

3. A column and bearing assembly comprising the combination of:
   (a) an integral pipe column, a shaft in said pipe column,
   (b) a guide bearing assembly disposed in said pipe column to support said shaft, said guide bearing assembly comprising:
      (1) a one piece bearing housing extending through said pipe column, said bearing housing having circular arc end portions,
      (2) a sleeve bearing disposed in said bearing housing to provide a wear surface for said shaft,
      (3) said circular arc end portions being provided with screw holes, and
      (4) screws disposed in said screw holes to anchor said guide bearing assembly to said column.

4. A column and bearing assembly comprising the combination of:
   (a) an integral pipe column, said column being provided with a smooth outer surface, a shaft in said pipe column,
   (b) a guide bearing assembly disposed in said pipe column to support said shaft, said guide bearing assembly comprising:
      (1) a one piece bearing housing extending through said column, said bearing housing being provided with circular arc end portions to fit around said smooth outer surface,
      (2) a sleeve bearing disposed in said bearing housing to provide a wear surface for said shaft,
      (3) said circular arc end portions being provided with screw holes, and
      (4) screws disposed in said screw holes to press against said smooth outer surface to anchor said guide bearing assembly to said column.

5. A column and bearing assembly comprising the combination of:
   (a) an integral pipe column, a shaft in said pipe column,
   (b) a guide bearing assembly disposed in said pipe column to support said shaft, said guide bearing assembly comprising:
      (1) a one piece bearing housing extending through said pipe column, said bearing housing being provided with a leg at each end,
      (2) a sleeve bearing disposed in said bearing housing to provide a wear surface for said shaft,
      (3) said legs being provided with screw holes, and
      (4) screws disposed on said screw holes to anchor said guide bearing assembly to said column.

6. A column pipe and bearing assembly comprising the combination of:
(a) an integral pipe column, a shaft in said pipe column,
(b) a guide bearing assembly disposed in said pipe column to support said shaft, said guide bearing assembly comprising:
(1) a one piece bearing housing extending through said column, said bearing housing being provided with a circular arc leg at each end,
(2) a sleeve bearing disposed in said bearing housing to provide a wear surface for said shaft, and
(3) said circular arc leg being provided with screw holes, and
(4) screws disposed in said screw holes to anchor said guide bearing assembly to said column.

7. A column and bearing assembly comprising the combination of:
(a) an integral pipe column, said column being provided with a smooth outer surface; a shaft in said pipe column,
(b) a guide bearing assembly disposed in said pipe column to support said shaft, said guide bearing assembly comprising:
(1) a one piece bearing housing extending through said pipe column, said bearing housing being provided with a circular arc leg at each end to fit around said smooth outer surface,
(2) a sleeve bearing disposed in said bearing housing to provide a wear surface for said shaft,
(3) said circular arc leg at each end being provided with screw holes, and
(4) screws disposed in said screw holes to press against said smooth outer surface to anchor said guide bearing assembly to said column.

8. A column and bearing assembly comprising the combination of:
(a) an integral one-piece pipe column, a shaft in said pipe column,
(b) guide bearing means disposed in said pipe column to support said shaft, said guide bearing means comprising:
(1) a bearing housing extending through said column,
(2) bearing means disposed in said bearing housing to provide a wear surface for said shaft, and
(3) anchor means disposed on said bearing housing to anchor said guide bearing means to said column.

9. A column and bearing assembly comprising the combination of:
(a) an integral one-piece pipe column, a shaft in said pipe column,
(b) guide bearing means disposed in said pipe column to support said shaft, said guide bearing means comprising:
(1) a bearing housing extending through said column,
(2) a sleeve bearing disposed in said bearing housing to provide a wear surface for said shaft,
(3) said bearing housing being provided with screw holes, and
(4) screws disposed in said screw holes to anchor said guide bearing means to said column.

10. A column and bearing assembly comprising the combination of:
(a) an integral one-piece pipe column, a shaft in said pipe column,
(b) a guide bearing assembly disposed in said pipe column to support said shaft, said guide bearing assembly comprising:
(1) a bearing housing extending through said column,
(2) a sleeve bearing disposed in said bearing housing to provide a wear surface for said shaft,
(3) said bearing housing being provided with screw holes,
(4) screws disposed in said screw holes to anchor said guide bearing means to said column, and
(5) conduits disposed in said bearing housing and in said sleeve bearing to provide lubrication to said sleeve bearing.

11. A column and bearing assembly comprising the combination of:
(a) an integral one-piece pipe column, a shaft in said pipe column,
(b) a guide bearing assembly disposed in said pipe column to support said shaft, said guide bearing assembly comprising:
(1) a bearing housing extending through said pipe column, said bearing housing having circular arc end portions,
(2) a sleeve bearing disposed in said bearing housing to provide a wear surface for said shaft,
(3) said circular arc end portions being provided with screw holes, and
(4) screws disposed in said screw holes to anchor said guide bearing assembly to said column.

12. A column and bearing assembly comprising the combination of:
(a) an integral one-piece pipe column, a shaft in said pipe column, said pipe column being provided with a smooth outer surface, and
(b) a guide bearing assembly disposed in said pipe column to support said shaft, said guide bearing assembly comprising:
(1) a bearing housing extending through said column, said bearing housing being provided with circular arc end portions to fit around said smooth outer surface,
(2) a sleeve bearing disposed in said bearing housing to provide a wear surface for said shaft,
(3) said circular arc end portions being provided with screw holes, and
(4) screws disposed in said screw holes to press against said smooth outer surface to anchor said guide bearing assembly to said column.

13. A column and bearing assembly comprising the combination of:
(a) an integral one-piece pipe column, a shaft in said pipe column,
(b) a guide bearing assembly disposed in said pipe column to support said shaft, said guide bearing assembly comprising:
(1) a bearing housing extending through said pipe column, said bearing housing being provided with a leg at each end,
(2) a sleeve bearing disposed in said bearing housing to provide a wear surface for said shaft,
(3) said legs being provided with screw holes, and
(4) screws disposed on said screw holes to anchor said guide bearing assembly to said column.

14. A column pipe and bearing assembly comprising the combination of:
(a) an integral one-piece pipe column, a shaft in said pipe column,
(b) a guide bearing assembly disposed in said pipe column to support said shaft, said guide bearing assembly comprising:
(1) a bearing housing extending through said pipe column, said bearing housing being provided with a circular arc leg at each end,
(2) a sleeve bearing disposed in said bearing housing to provide a wear surface for said shaft, and
(3) said circular arc leg at each end being provided with screw holes, and
(4) screws disposed in said screw holes to anchor said guide bearing assembly to said column.

15. A column and bearing assembly comprising the combination of:
 (a) an integral one-piece pipe column, a shaft in said pipe column, said pipe column being provided with a smooth outer surface, and
 (b) a guide bearing assembly disposed in said column to support said shaft, said guide bearing assembly comprising:
  (1) a bearing housing extending through said column, said bearing housing being provided with a circular arc leg at each end to fit around said smooth outer surface,
  (2) a sleeve bearing disposed in said bearing housing to provide a wear surface for said shaft,
  (3) said circular arc leg at each end being provided with screw holes, and
  (4) screws disposed in said screw holes to press against said smooth outer surface to anchor said guide bearing assembly to said column.

References Cited by the Examiner
UNITED STATES PATENTS

| | | | |
|---|---|---|---|
| 665,262 | 1/01 | Peck | 198—213 |
| 1,424,362 | 8/22 | Krogh | 308—168 |
| 2,097,853 | 11/37 | Bristol | 308—4 |
| 2,147,878 | 2/39 | Burmeister | 198—213 |
| 2,616,662 | 11/52 | Mierley | 308—15 |

FOREIGN PATENTS 736,269   9/55   Great Britain.

ROBERT C. RIORDON, *Primary Examiner.*

FRANK SUSKO, *Examiner.*